United States Patent
Moeglein et al.

(10) Patent No.: US 8,712,440 B2
(45) Date of Patent: Apr. 29, 2014

(54) SPARSE NETWORK ALMANAC

(75) Inventors: Mark Leo Moeglein, Ashland, OR (US); Zoltan F. Biacs, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 601 days.

(21) Appl. No.: 12/877,262

(22) Filed: Sep. 8, 2010

(65) Prior Publication Data

US 2011/0059756 A1 Mar. 10, 2011

Related U.S. Application Data

(60) Provisional application No. 61/241,239, filed on Sep. 10, 2009.

(51) Int. Cl.
*H04W 24/00* (2009.01)
(52) U.S. Cl.
USPC ........................................ 455/456.3; 370/338
(58) Field of Classification Search
CPC ......... H04W 48/18; H04W 8/06; H04W 8/08; H04W 40/20
USPC ....................................... 455/456.3; 370/338
See application file for complete search history.

(56) References Cited

U.S. PATENT DOCUMENTS

| | | | |
|---|---|---|---|
| 6,865,395 B2 | 3/2005 | Riley | |
| 7,123,928 B2 | 10/2006 | Moeglein et al. | |
| 7,127,257 B2 | 10/2006 | Riley et al. | |
| 8,145,234 B1 * | 3/2012 | Leonard et al. | 455/456.1 |
| 2004/0104841 A1 | 6/2004 | Syrjarinne | |
| 2005/0037775 A1 | 2/2005 | Moeglein et al. | |
| 2005/0122259 A1 * | 6/2005 | Sairo et al. | 342/357.1 |
| 2005/0227689 A1 * | 10/2005 | Jewett | 455/433 |
| 2006/0227045 A1 | 10/2006 | Sheynblat | |

FOREIGN PATENT DOCUMENTS

| | | |
|---|---|---|
| EP | 1783929 A1 | 5/2007 |
| EP | 2059075 A2 | 5/2009 |
| WO | 9919743 A1 | 4/1999 |
| WO | 2006044931 | 4/2006 |

OTHER PUBLICATIONS

International Search Report and Written Opinion—PCT/US2010/048509, International Search Authority—European Patent Office—Feb. 4, 2011.

\* cited by examiner

*Primary Examiner* — Marcos Batista
(74) *Attorney, Agent, or Firm* — Jennifer M. Pascua

(57) ABSTRACT

The subject matter disclosed herein relates to creation, maintenance, communication, and/or use of sparse network almanac information that may be located in a mobile station.

82 Claims, 7 Drawing Sheets

SPARSE NETWORK ALMANAC

CROSS-REFERENCE TO RELATED APPLICATIONS

The current application claims priority to U.S. Provisional Patent Application Ser. No. 61/241,239, filed on Sep. 10, 2009, which is incorporated herein by reference in its entirety.

BACKGROUND

1. Field

The subject matter disclosed herein relates to creation, maintenance, communication, and/or use of sparse network almanac information.

2. Information

An ever-increasing popularity and growth of wireless communications has led to an increasingly complex infrastructure including wireless networks, cell towers, repeaters, Wi-Fi, local area networks (LAN), femto-cells, pico-cells, and satellite positioning systems, for example. Multiple, sometimes competing, wireless communications carriers owning and/or operating their own infrastructural wireless system elements may add to such a complexity. For example, multiple carriers may own and operate their own respective group of cell towers. Wireless communications coverage of such groups may overlap so that a transmitter may operate in a coverage area that includes cell towers of multiple carriers. Because of a competing nature of multiple wireless carriers, the complexity of a wireless communications infrastructure, and/or the relatively rapid increase in the number of transmitters, for example, a presence and/or location of many transmitters may not be well known. For instance, a cell tower operated by one wireless carrier may not be known by another wireless carrier.

BRIEF DESCRIPTION OF THE FIGURES

Non-limiting and non-exhaustive features will be described with reference to the following figures, wherein like reference numerals refer to like parts throughout the various figures

SUMMARY

Figure 1:
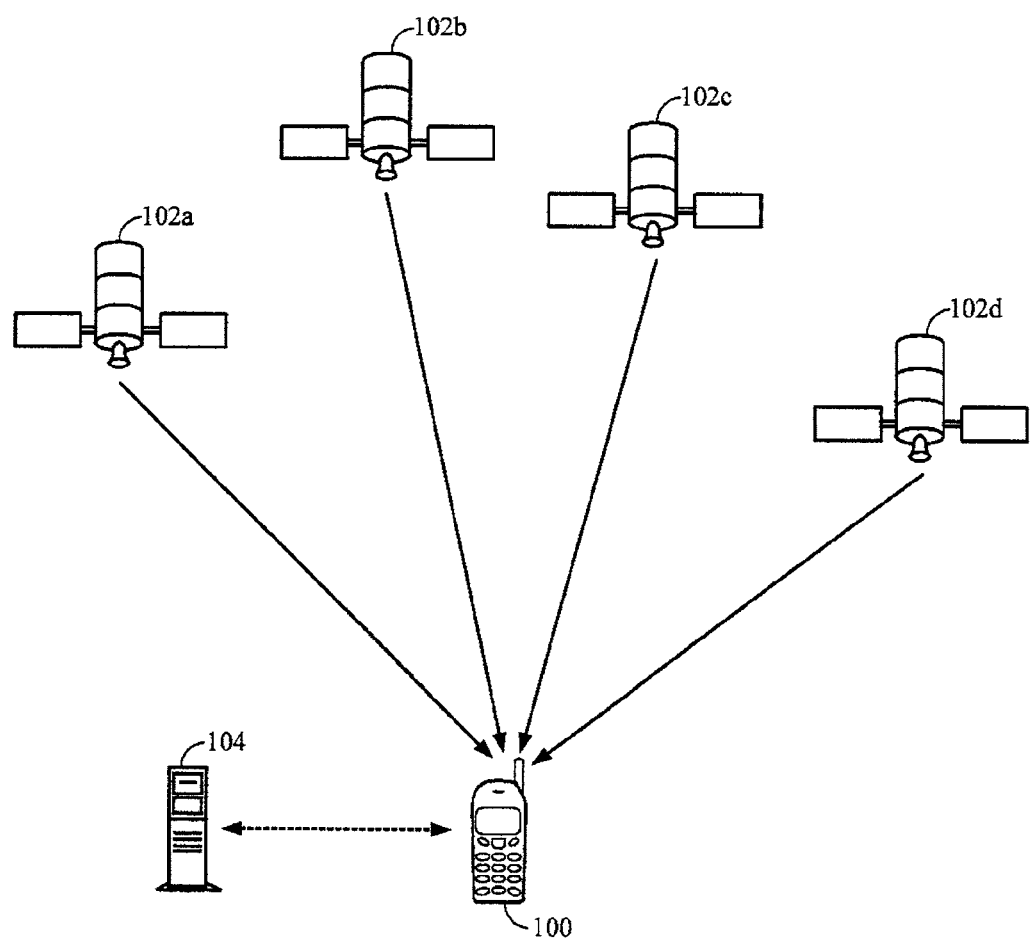
FIG. 1 illustrates an application of a satellite positioning system, according to an implementation.

In one particular implementation, a method may comprise receiving information from one or more transmitters located in a region, and associating a location fix of a mobile station operating in the region with the received information to update a sparse network almanac. It should be understood, however, that this is merely an example implementation and that claimed subject matter is not limited to this particular implementation.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

As noted above, we live in a world of increasing communication complexity of wireless devices and systems. This complexity provides a number of benefits, including additional access to information and services in more locations, and additional choice in services and service providers. One particular benefit is the ability to use many types of positioning information and many different positioning techniques.

However, some challenges accompany the additional complexity. With more service providers, transmitters, and types of wireless communications, using infrastructure for information and positioning signals can be more difficult. In particular, as the amount of information relevant to infrastructure increases, it becomes more difficult to manage the information for efficient positioning.

One important source of information related to infrastructure is referred to as a base station almanac. In positioning, the term "almanac" generally refers to a list of identifiers with associated attributes, such as coverage area, antenna position, antenna orientation and opening, calibration values, repeater flags, and the like. In positioning techniques that use signals from terrestrial transmitters (such as base stations), a base station almanac (BSA) storing information about the transmitters can be accessed. Transmitter-specific information stored in the BSA generally includes factors like the transmitter ID, antenna position, antenna orientation and opening, calibration values, repeater flags, maximum antenna range (MAR) and the like. For transmitters using sectors (a plurality of antenna elements each covering a segment of the surrounding area), sector information can be included in the BSA as well. One description of base station almanacs can be found in U.S. Pat. No. 7,123,928, which is herein incorporated by reference in its entirety.

In some current implementations, a carrier stores the BSA for its entire system of transmitters in one or more network resources, such as a Position Determining Entity (PDE). Because of the amount of information in such an implementation, the BSA generally needs to be stored in a network resource rather than at the mobile device. In order to use the almanac information in a positioning operation, the mobile device may send information related to its communications to the PDE via a serving base station. The PDE receives the information, which may be indicative of ranges to the sectors, received signal strength, pseudorandom noise (PN) phases for the sectors, and so on. The PDE also receives the identifier for each sector, as determined by the terminal based on the signal or messages received from the sector. The PDE looks up each sector in the base station almanac database based on the protocol type and sector identifier. Information indicative of the position of the transmitter/sector can be ascertained, and used to determine an initial coarse position of the mobile device (either by itself or with additional information such as signal strength information).

For a positioning technique that incorporates satellite positioning, the coarse position can be used as a seed position to set search windows. For a positioning technique that incorporates terrestrial ranging such as Advanced Forward Link Trilateration (AFLT), Time Difference of Arrival (TDOA), etc., the position of the transmitter is used in the range determination. In some cases, the position of the transmitter can be used by itself or with signal strength measurements to determine the position of the mobile device (which in general will be significantly less accurate than satellite and/or terrestrial ranging positions).

When the BSA is available and has the needed information, the above process can provide efficient positioning. However, problems arise when a BSA cannot be accessed, or when the BSA does not have information about particular transmitters. In this case, some available positioning techniques use a country code lookup for a coarse position, but this is generally not accurate enough for efficient positioning. For a mobile device located in the United States, a country code lookup implementation would return a coarse position corresponding to the center of the United States (including Alaska and Hawaii). As a rough estimate, a coarse position with an uncertainty of about 75 kilometers is desired for a satellite positioning technique.

Some known systems for learning and managing base station almanac information may be relatively inflexible, oriented towards one or more particular transmitter types. Such systems also may not allow for learning and conveying regional information where not all transmitters are known, though a hierarchical transmitter ID structure may be available. In a particular embodiment, a process may solve problems associated with fragmentary information, for example. Such a process may include maintaining location information and corresponding time information regarding when a mobile station receives signals from one or more particular transmitters. A centralized repository of such information may maintain a record of region size as well as coverage area of the particular transmitters.

An entity such as a mobile station (MS) may communicate with a wireless network, operated by a wireless service provider, for example, to request information and other resources. Such communication between an MS and a wireless network may be facilitated through any number of cellular base stations, cell towers, and/or transmitters, just to name a few examples. Each such transmitter may provide communication for a respective coverage area or cell. The term "cell" may refer to a transmitter and/or its coverage area. To increase system capacity, a coverage area of a transmitter may be partitioned into sectors. The term "transmitter" as used herein may refer to a WWAN base station that serves a cell and/or a base station that serves a sector, a repeater, an access point, a femtocell, a picocell, a television transmitter, and/or a radio station transmitter, such as for the FM band, for example. An MS may include a cellular telephone, a personal digital assistant (PDA), smart phone, lap top computer, tablet computer, a personal computer, a wearable computer, a personal digital assistant, a navigation device, just to name a few examples. Communication between a wireless network and an MS may involve determining a location fix of the MS operating within the network: data received from the network may be beneficial or otherwise desired for such a location determination. However, these are merely examples of data exchange between an MS and a network in a particular aspect, and claimed subject matter is not limited in these respects.

In one implementation, an MS may collect information regarding wireless infrastructure in a region in which the MS operates. Such infrastructure may include one or more wireless networks, cell towers, transmitters, Wi-Fi base stations, local area networks (LAN), radio station transmitters, and/or television stations transmitters, for example. Information associated with such an infrastructure pertaining to a transmitter, for example, may include latitude/longitude of the transmitter location, a coverage area of the transmitter, an identification code associated with the transmitter, and/or a wireless carrier associated with the transmitter, for example. In the present context, a region may comprise an area that surrounds the MS that is large enough to include at least one transmitter. In an implementation, an MS may learn of the existence of a transmitter by receiving a wireless signal from the transmitter. Such a wireless signal may include any such transmission by the transmitter that an MS may receive, whether or not such transmission is intended for the MS. Accordingly, an MS may receive such a transmission merely by operating within a transmission, or coverage region of the transmitter, for example.

In an implementation, a mobile station may operate and/or maintain a sparse network almanac (SNA), which may include a regional transmitter-specific almanac, known as a base station almanac (BSA), and a service area almanac. For example, a BSA may include location information descriptive of transmitter positions and/or one or more service areas associated with a transmitter or group of transmitters. Such service areas may be defined by a center and an associated radius, for example, though service areas need not be circular. An MS may use such an SNA to make decisions regarding wireless communications and/or location fixes. For example, information included in an SNA may be used in combination with measurements (e.g., ranges) for transmitters to derive a final location estimate for an MS. Such an SNA may be stored on an MS and include information pertaining to a region of MS operation, for example. Such information may include location information and coverage area for a particular transmitter. In a particular implementation, an SNA may store transmitter identification and antenna locations, time offsets, timestamps, calibration and uncertainty parameters, default values, and/or other parameters. An SNA may also identify cell sectors whose identity observed by the MS or reported by the cellular infrastructure has changed due to a network change or reconfiguration. Such an identity may no longer match a database included in a transmitter almanac, for example. In such a case, an MS may automatically update information maintained in its SNA in response, at least in part, to observing changed cell sector identities. In a particular embodiment, a service area almanac portion of an SNA may include information to cover a relatively large region (e.g., a national or global region). However, to provide a capability of being storable in an MS having limited memory capacity, such information may include a relatively coarse description of such a region. On the other hand, a BSA portion of an SNA may not cover as large of a region, instead being descriptive of a small sub-region of the larger region, but such a description of the small sub-region may include a more detailed description of the smaller region that it covers.

In an implementation, information stored in an SNA may be used to obtain MS location fixes under a variety of conditions. In a particular implementation, an SNA may provide information to an MS to determine an initial location estimate to assist in determining a more accurate location estimate using satellite positions system (SPS) pseudorange measurements and/or terrestrial measurements. In another particular implementation, an SNA may include information enabling an MS to resolve an ambiguity about which observed pseudorandom noise sequences are associated with physical sectors of a GPS-capable IS-95 CDMA network, for example. In yet another particular implementation, an SNA may indicate a cellular base station sector transmitter location and/or coverage area information for the transmitter that is sending the observed signals. An MS may ascertain such a transmitter location by receiving such observed signals, as described above. Of course, such functionalities of an SNA are merely examples, and claimed subject matter is not so limited.

In an implementation, information stored in a SNA may be communicated via an MS to a transmitter of a wireless network. In this fashion, and in the normal course of mobile station usage, an MS including an SNA may search for and/or monitor regional transmitters and, for example, their coverage area. Such an MS may collect information regarding regional transmitters and upload the collected information to a wireless network from time to time. In a particular aspect, such information may be used to determine neighbor relationships among transmitters. For example, an MS may be in multiple, overlapping coverage areas associated with neighboring transmitters. By receiving signals from such neighboring transmitters, the MS may approximate a location of one transmitter relative to a location of another transmitter. In another particular aspect, a relatively large number of such mobile stations distributed over a relatively large area may collectively produce and/or update a relatively extensive database of information relating to transmitters by providing collected information associated with the transmitters to a wireless network. Accordingly, information regarding newly added transmitters may be provided to a wireless network by an MS "in the field", for example.

As described above, a BSA may include information for a plurality of regions in which an MS is located and/or operates. Such information may include data pertaining to one or more transmitters that are within particular regions. In one implementation, such information may have been loaded into a BSA earlier during initial programming of an MS processor system, for example. In this case, a database description of known transmitters may be included in such programming. In another implementation, such information about one or more regional transmitters may have previously been collected by the MS during operation in a particular region. In any case, on occasion, a presence of a specific transmitter may not be reflected in information included in a BSA. In such a case, an MS, utilizing its BSA, may infer the potential service areas of such a transmitter from what is known about transmitters in the same region (e.g., with the same region identifiers). Such a process may be referred to as implicit region handling.

In one implementation, a portion of communication from a transmitter may include a pilot signal modulated by information identifying the transmitter. Such information may include latitude/longitude of the transmitter and/or an identification code associated with the transmitter and a wireless carrier. In a particular process, an MS may host a resident application to identify and extract transmitter identification from a pilot signal, and include such transmitter identification into a stored almanac.

In another implementation, as in the case above, an MS may comprise an SNA including a BSA comprising information for one or more of a plurality of regions where the MS is located and/or operates. Also as in the case described above, such information may have been loaded into a BSA previously during initial programming of an MS processor system so that a database of known service areas may be included in such programming. Or such information about one or more regions may have earlier been collected by the MS during operation in the particular network. In any case, on occasion, the presence of a region/service area may not be reflected in information included in a BSA. In such a case, an MS, utilizing a communication link, may receive information regarding the presence of such a service area from a wireless network. This process may be referred to as explicit region handling.

In an implementation, a BSA may include transmitter information, such as transmitter identification and location, just to name a few examples, for a relatively large number of transmitters in a region in which the MS may operate. Accordingly, an MS may readily operate within a region, utilizing a database of transmitter information in its regional almanac. As an MS moves outside a region covered by a BSA, however, its BSA may be less knowledgeable regarding the new region's transmitters. In such a case, an MS may request information from a wireless network regarding the new region's transmitters, for example, or it may use the known coverage area of the larger region, which is available from the SNA. An MS may place information received from a network into a BSA to update the SNA in response to receiving said information from the network or inferring it from its own position fixes.

An MS may include a capability to determine its location using SPS signals, such as in SPS and/or other global navigation satellite systems. However, a mobile station may determine a location without processing such SPS signals, according to an implementation. For example, an MS may communicate with a cellular base station, such as a cell tower and/or transmitter, while within an associated coverage cell. In a particular implementation, a BSA may include information pertaining to such a cell tower. Accordingly, an MS may use such information, which may include location data of a regional transmitter, to determine its location without relying on acquisition of SPS signals. In another particular implementation, an MS may use information included in a BSA to reduce a signal acquisition window, leading to improved operating efficiency. For example, an MS may use transmitter location information included in a BSA in conjunction with SPS signals to reduce a navigation acquisition window, leading to improved efficiency of location fixes. For example, such a navigation acquisition window may comprise a GPS acquisition window such as a two-dimensional search "space," whose dimensions are code-phase delay and observed Doppler frequency shift, for example. Such a process may be further improved as a BSA is updated with additional transmitter information.

FIG. 1 illustrates an application of an SPS system, according to an implementation. An MS 100 in a wireless communications system receives transmissions from satellites 102a, 102b, 102c, 102d in the line of sight to MS 100, and derives time measurements from four or more of the transmissions (in general received code phase information, which are indicative of the pseudoranges to satellites 102a, 102b, 102c, and 102d). MS 100 may provide such measurements to location server 104, which may include a position determination entity (PDE), for example. Such a location server may determine a location of a station from the measurements. Alternatively, the subscriber station 100 may determine its own location from this information.

As in the implementation mentioned above, utilizing SPS satellite transmission signals, an MS 100 may determine its location with or without assistance from signals received from a location server 104, through a communication network, for example. In an MS-based (MSB) position mode, location for MS 100 may be determined at the MS. MS 100 may access information stored at the MS (e.g., in an onboard SNA (FIG. 2)) to retrieve satellite positioning data, for example, or may obtain at least some of the information from the network ("assisted" positioning). For an example of the GPS satellite system, satellite positioning data may include satellite almanac data (information about the position of each of the satellites in the GPS constellation as a function of time) and/or satellite ephemeris information (more accurate positioning information for a particular satellite of the constellation). Using the satellite positioning data, current time, a coarse position, and an estimate of the uncertainty in the coarse position, MS 100 may determine which satellites may be in view, and determine search windows. If the time and/or coarse position are not available, positioning may be more difficult, since the MS 100 may not know which satellites should be in view and may be unable to estimate the expected code phase at the receiver.

On the other hand, location information for MS 100 in an MS-assisted location mode may be determined at location server 104 instead of at the MS. In a particular implementation, MS 100 having a capability of retrieving transmitter positioning data from its onboard BSA may reduce or eliminate a need for a wireless network to provide, for example, satellite information to MS 100. It may also eliminate the need to search for SPS signals. Using such BSA information, location server 104 may determine location information of MS 100, which may then be transmitted from location server 104 to MS 100. Use of MS-assisted location mode may enable a fix if, for example, MS 100 is not in a favorable RF environment to acquire SPS signals for a location fix, but is nevertheless able to communicate with location server 104 for assistance.

Figure 2:
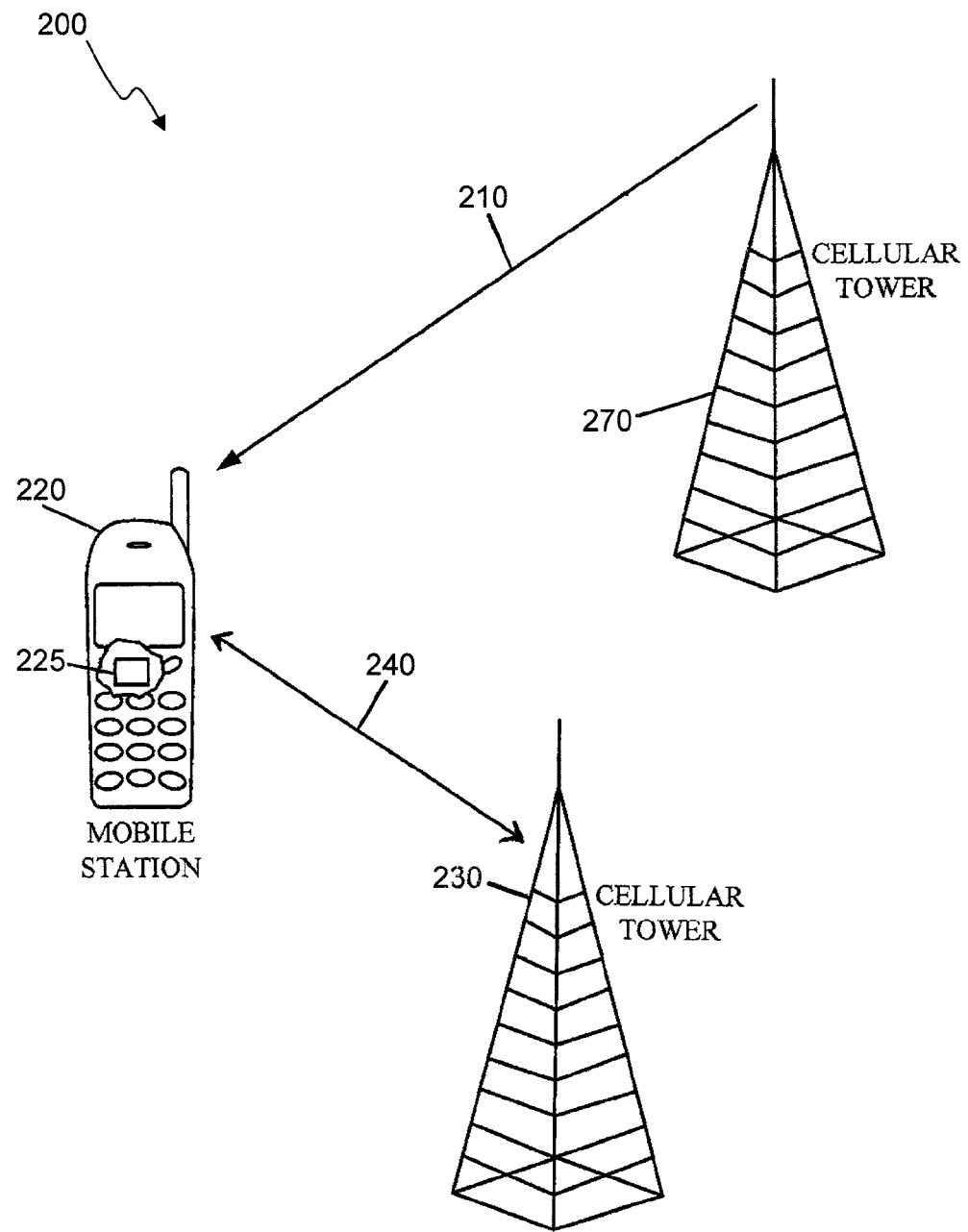
FIG. 2 is a schematic diagram showing a wireless network, according to an implementation.

FIG. 2 is a schematic diagram showing a wireless system 200, according to an implementation. An MS 220 may comprise an SNA, which may further comprise a BSA 225, as described above. BSA 225 may include information regarding one or more cellular base stations, such as a transmitter 230. Such information may include the transmitter's identification, location, and so on. MS 220 may exchange information with one or more transmitters 230 via path 240. One or more transmitters 230 may be located in a region close enough to MS 220 for wireless communication. Meanwhile, another transmitter 270 may also be located within such a region. Transmitter 270 may be as-yet unknown to MS 220. In other words, BSA 225 may not include any data or information regarding transmitter 270. As explained below with reference to FIG. 4, however, BSA 225 may learn about transmitter 270 by receiving a signal, such as a pilot signal 210, from transmitter 270. Such a pilot signal is well-known in the art, and may be dictated by IS-95A, IS 2000, and J-STD-008 standards, for example. Transmitter 270 may comprise a CDMA radio access network. A pilot signal, which may be carrier modulated by a pseudonoise sequence, may be used for time synchronization, handoff among cellular base stations, and provision of a coherent reference, to name a few examples.

Figure 3A:
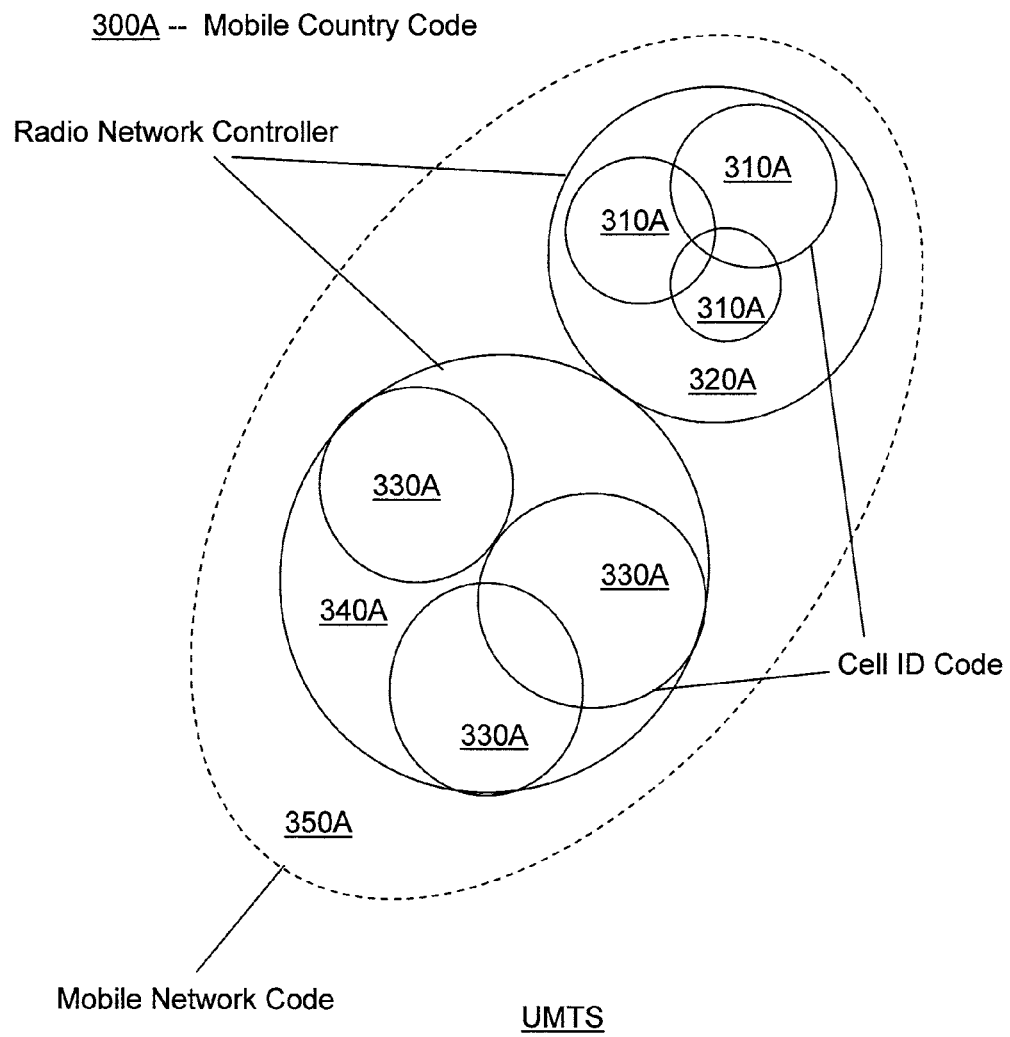
FIGS. 3A-3C are schematic diagrams showing a hierarchy of service area levels, according to an implementation.
Figure 3B:
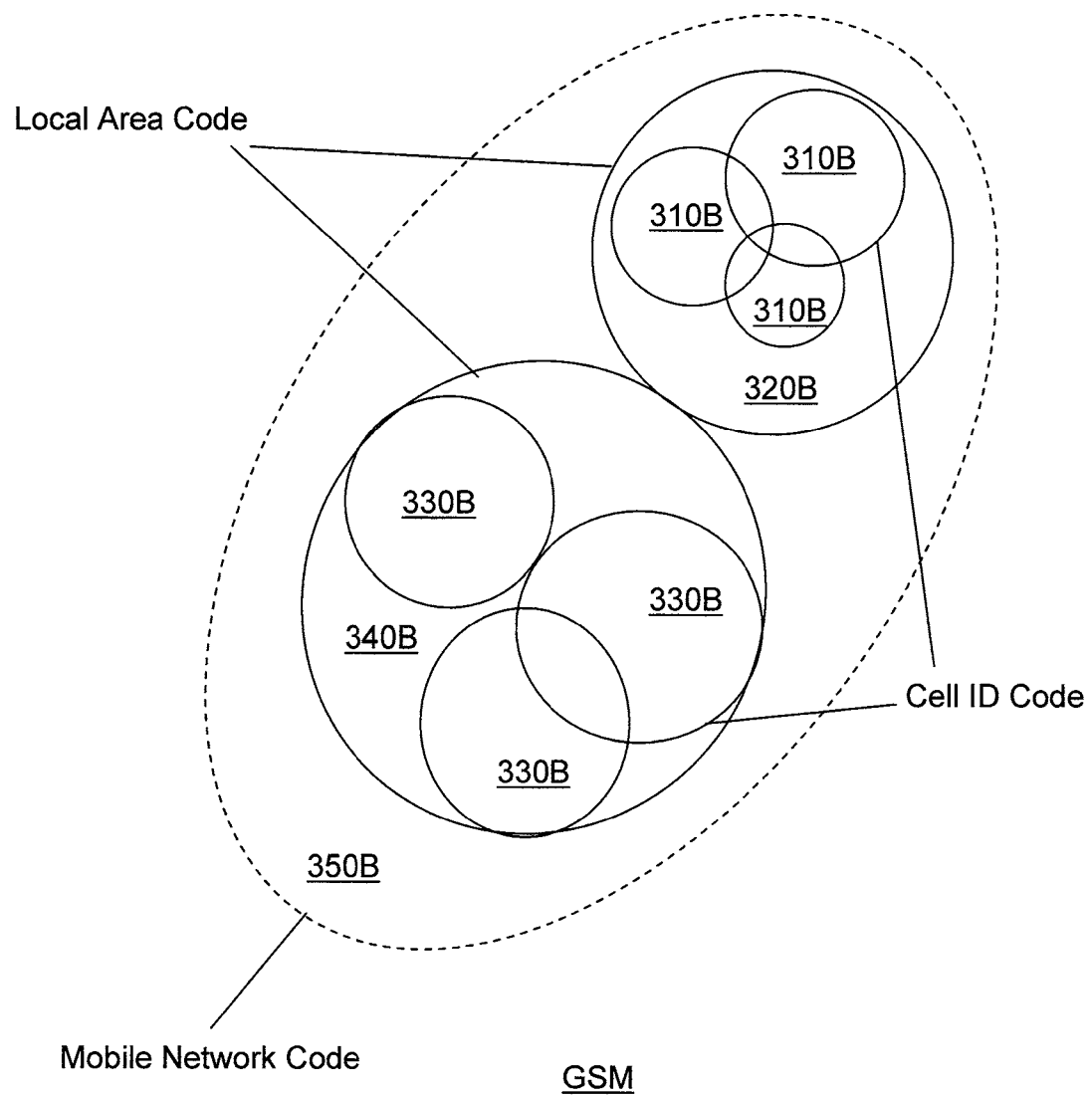
Figure 3C:
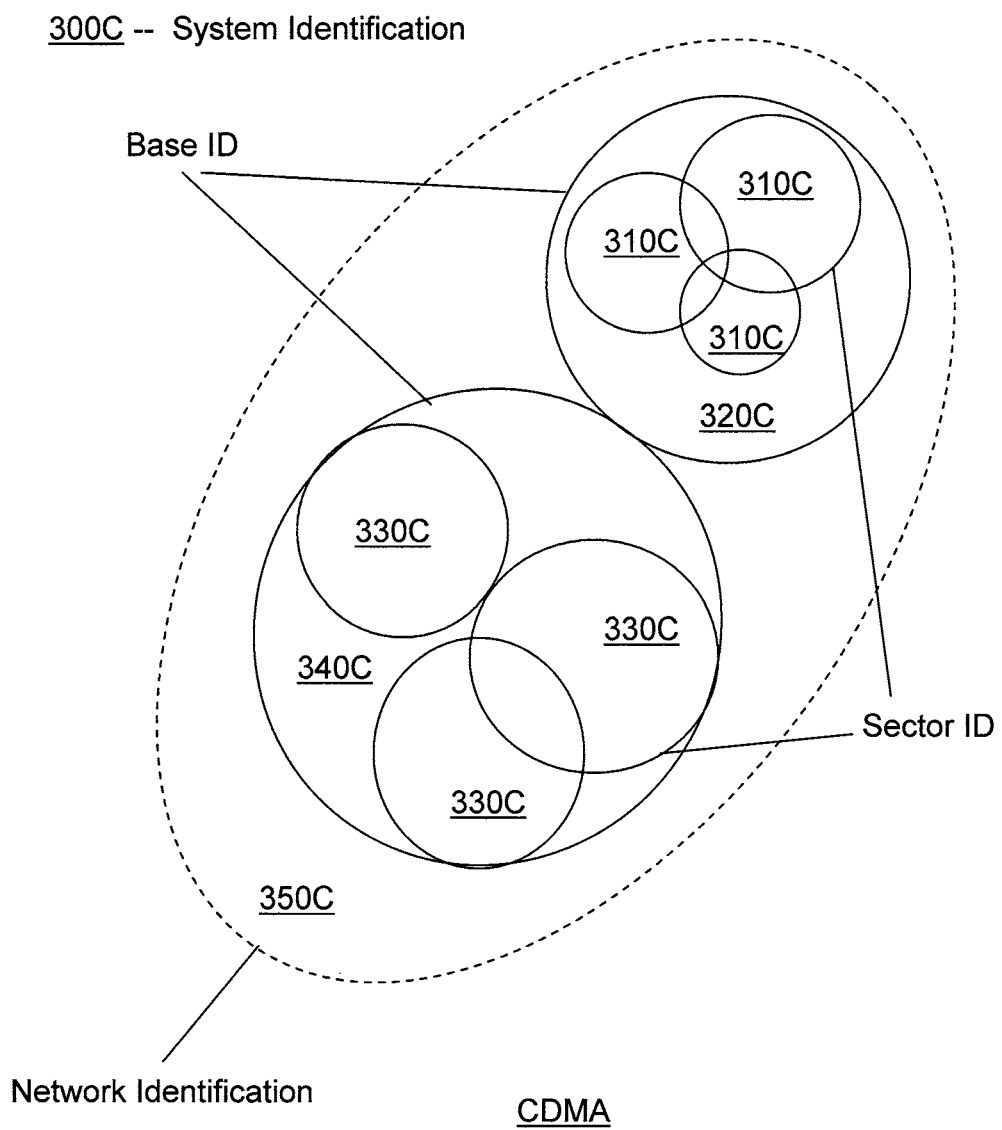

In an implementation, an SNA may include hierarchally defined information regarding transmitters associated with a particular hierarchal service area level of transmitters. In particular, as described above, an SNA may include a BSA and a service area almanac. For example, a service area almanac may comprise hierarchally defined information such as a service level defining geographical entities that may cover a service area. A geographical portion of a country, for example, may comprise such a geographical entity. In addition, a service level may include one or more sub-service levels defining smaller geographical entities within the larger service level. In contrast, a BSA may comprise smaller geographical entities such as states and/or counties within a portion of a country, for example, or may represent the coverage area of one or more mobile switches. For example, such service area level hierarchies are shown in FIGS. 3A, 3B, and 3C. In a particular implementation, FIG. 3A shows UMTS standard interface technology. Such a standard may categorize service area levels of transmitters based on a hierarchy of levels, including Mobile Country Code (MCC) 300A to identify a cellular system in a specific region, and Mobile Network Code (MNC) 350A to identify a smaller network within an MCC cellular system. Such levels may be covered by a service area almanac, for example. Continuing lower in such a hierarchy, a Radio Network Controller (RNC), such as RNC's 320A and 340A may identify individual control regions within an MNC. Individual RNC control regions may in turn include their respective transmitters, which may be individually identified by a Cell ID Code (CI), such as CI 310A and CI 330A, respectively. Such lower levels may be covered by a BSA, for example, though claimed subject matter is not limited to such a particular hierarchical division between a service area almanac and a BSA. For example, MCC 300A is assigned to a given country, and MNC 350A may be used to identify a carriers' network in a given country. Of course, such hierarchal service levels are merely examples and claimed subject matter is not limited to such implementations or examples described herein.

In another particular implementation, FIG. 3B shows GSM standard interface technology. Such a standard may categorize service area levels of transmitters based on a hierarchy of levels, including Mobile Country Code (MCC) 300B to identify a cellular system in a specific region (typically a country), and Mobile Network Code (MNC) 350B to identify a carrier network within an MCC cellular system. Such levels may be covered by a service area almanac, for example. Continuing lower in such a hierarchy, a Local Area Code (LAC), such as LAC's 320B and 340B may identify individual regions of stations and/or transmitters within a MNC. Individual LAC's may in turn include their respective transmitters, which may be individually identified by a Cell ID Code (CI), such as CI 310B and CI 330B, respectively. Such lower levels may be covered by a BSA, for example, though claimed subject matter is not limited to such a particular hierarchical division between a service area almanac and a BSA. For example, MCC 300B may be assigned to a given country, and MNC 350B may be assigned to a single carrier in the country. Of course, such hierarchal service levels are merely examples and claimed subject matter is not limited to such implementations or examples described herein.

In yet another implementation, FIG. 3C shows CDMA standard interface technology. Such a standard may categorize service area levels of transmitters based on a hierarchy of levels, including System Identification (SID) 300C to identify a cellular system in a specific region, and Network Identification (NID) 350C to identify a smaller network, often associated with a mobile switch, within a SID cellular system. Such levels may be covered by a service area almanac, for example. Continuing lower in such a hierarchy, a Base ID, such as Base ID's 320C and 340C may identify individual base stations and/or transmitters within a NID. Individual Base ID regions may in turn include their respective transmitters identified by Sector ID 310C and sector ID 330C, respectively. Such lower levels may be covered by a BSA, for example, though claimed subject matter is not limited to such a particular hierarchical division between a service area almanac and a BSA. For example, SID 300C may be assigned to a network carrier, and NID 350C may be used to further breakdown networks of the carrier. Of course, such hierarchal service levels are merely examples and claimed subject matter is not limited to such implementations or examples described herein.

In yet another implementation, an SNA may comprise non-hierarchically defined information based at least in part on hierarchically defined information. For example, non-hierarchically defined information may comprise one or more WiFi access points and hierarchically defined information may comprise one or more wide area network elements. In another example regarding WiFi, if WiFi access points are known, such information may be used in a hierarchical fashion, similar to the Wide Area Networks described above. In yet another example, a MAC address need not be organized hierarchically. In such cases, transmitters may be grouped geographically or associated with a hierarchical network based upon co-visibility, for regional almanac handling.

In another implementation, WiFi standard interface technology may operate at least partially without a hierarchical information structure. In such a case, WiFi access points, such as those which may be identified by their respective MAC addresses for example, may be grouped based at least in part on their geographic location. Of course, such non-hierarchical technologies are merely examples, and claimed subject matter is not so limited.

In a particular implementation, an MS may request information from a wireless network regarding transmitters associated with a different hierarchal service area level of transmitters than what may already be included in an SNA. Returning to FIG. 3C, for example, information regarding transmitters in Base ID 320C may be useful for wireless communication in a region in which an MS operates, but such information may not be useful in another region to which an MS may move, such as a region covered by Base ID 340C. Accordingly, an MS may request information from a wireless network regarding transmitters in Base ID 340C. Such a request may also include information regarding transmitters in a region covered by a NID, such as NID 350C. In this case, both NID 350C and Base ID 340C cover a region in which an MS may be operating. In other words, though a BSA may include information regarding transmitters associated with a Base ID level, such an MS may request transmitter information based on a NID level if such information is useful for position determination, for example. In a particular implementation, an SNA may be used by an MS to determine an appropriate service/coverage area type. For example, an MS may communicate through a particular base station, such as a transmitter in a sector ID 330C, if a BSA includes information for such a transmitter. If not, then an MS may decide to use a transmitter corresponding to a Base ID region, such as Base ID 340C, if a BSA includes information for such a region covered by the BSA. Similarly, if no such region is included in a BSA, then an MS may decide to use a transmitter corresponding to a NID region, such as NID 350, if an SNA, such as a service area almanac portion of the SNA, includes information for such a region. In this fashion, an MS may change from one service area level to another in order to involve a service area level that the MS finds useful. As an SNA is updated with information, an MS may reevaluate service/coverage area type based at least in part on the update SNA.

In an implementation, an MS may determine a probability of success for a location fix, an expected accuracy of a result, a search time, and/or a power usage for a subsequent location fix based at least in part on an updated SNA and/or associated regional BSA. Such a determination may then be used to decide whether to search for navigation information or merely use information already included in an SNA and/or associated regional BSA. For example, if an SNA includes an abundance of navigation information, then an MS may determine a relatively high probability of success and further determine that a request for information from a wireless network is not needed. In another example, if an SNA lacks substantial navigation information, then an MS may determine a relatively low probability of success and further determine that a request for service level information from a wireless network may be useful. Such service level information may include information pertaining to a hierarchal service area level of transmitters, as explained above. In another example, an MS may determine the probability of success for searches on various air interfaces based upon SNA or regional BSA information and use these probabilities to help determine for which signals to search.

As described above, an MS may operate in a particular hierarchical region associated with a particular service level of transmitters, for example. An MS may maintain an SNA comprising a BSA that includes information pertaining to ID parameters of such a particular service level of transmitters. Accordingly, a BSA may be used to narrow down what information is useful to an MS to a region covered by the hierarchical region. In a particular implementation, many coverage areas associated with such regions worldwide may be described by a relatively small amount of data in this fashion. In such a case, an MS may initially request a relatively general level of information from a wireless network, such as from a SID level shown in FIG. 3C, and subsequently request a relatively specific level of information. In a particular implementation, however, an SNA may include information from one or more hierarchical levels as well, such as information from transmitters identified by Sector ID 310C and Base ID 320C, for example. This information may be stored in a hybrid service level almanac within the mobile device.

Figure 4:
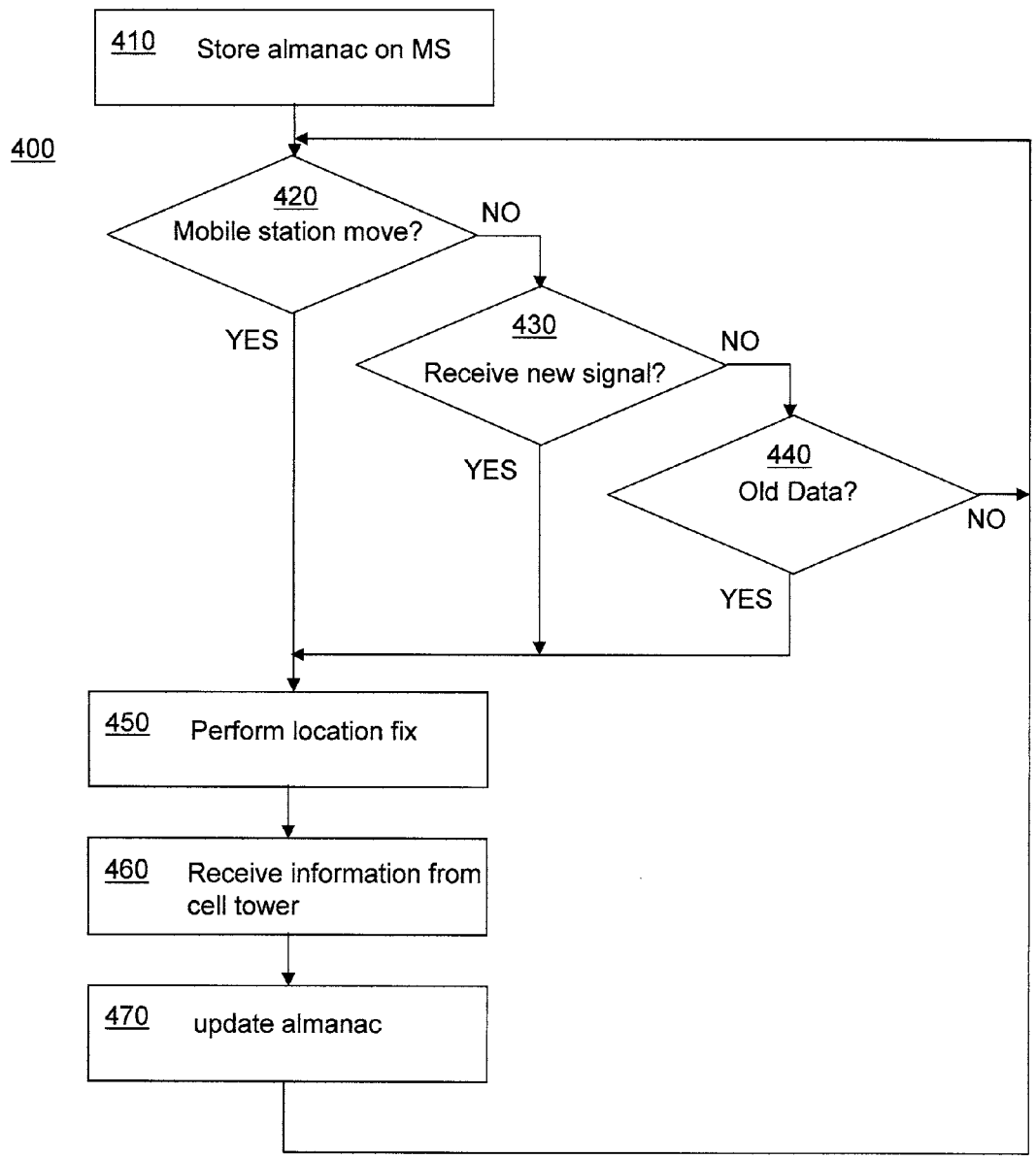
FIG. 4 is a flow diagram of a process of maintaining and updating an SNA, according to an implementation.

FIG. 4 is a flow diagram of a process 400 of maintaining and updating a BSA, according to an implementation. At block 410, an MS may maintain a BSA such as BSA 225 shown in FIG. 2, for example. BSA 225 may include data associated with transmitter 230. As shown in the implementation of FIG. 4, process 400 may include three circumstances that lead to updating a BSA: if MS 220 changes its location, if MS 220 receives a signal from an as-yet unknown transmitter, and/or if BSA data becomes too old to be reliable. Each of these circumstances is now discussed.

At block 420, a determination may be made as to whether MS 220 has changed locations from a first region to a second region. Such a determination may be made by monitoring regional transmitters via their signals that MS 220 receives. For example, if MS 220 changes location enough so that it begins to use one or more different transmitters, then one or more pilot signals received by MS 220 may change accordingly. In a particular example, a first region may comprise a group of transmitters and a second region may comprise another group of transmitters so that at least one transmitter is in one group and not the other group. Accordingly, MS 220 receiving a signal from a "new" tower may indicate a change in MS location. Upon such location change, MS 220 may perform a location fix at block 450 to determine its own location or reference a position fix recently stored in memory. Such a location fix may be performed by any of at least several different techniques. For example, MS 220 may determine pseudorange measurements to satellites using well known techniques based, at least in part, on detections of PN codes in signals received from the satellites, as described above. Also, MS 220 may receive data from a wireless communication network to estimate the location of the MS operating within the network.

At block 460, MS 220 may receive information from one or more transmitters 230. Such information may then be associated with a location fix performed at block 450. In a particular implementation, associating a location fix with information received from one or more transmitters may comprise determining which service levels among the service levels of transmitter information include the region in which MS 220 operates. Such a determination may be based at least in part on the received information and/or the location fix performed at block 450, for example. In this fashion, BSA 225 may be updated, as at block 470, with current regional transmitter information. Such an updating of BSA 225 may comprise maintaining and/or updating information corresponding to one or more regional levels already stored in BSA 225.

Returning to block 420, if instead of MS 220 moving, a signal may be received from an as-yet unknown transmitter 270, as determined at block 430, then a process to update BSA 225 may be performed. Such an update, as explained above, may include performing a location fix at block 450. Subsequently, at block 460, MS 220 may receive information from transmitter 270 and then associate this information with the location fix performed at block 450 to update BSA 225 at block 470. In this fashion, as MS 220 moves across a region of coverage of transmitter 270, the geographical location of the coverage area of transmitter 270 may be ascertained. Also, a location of as-yet unknown transmitter 270 may be at least approximately determined. For example, the strength of signal 210 emitted from transmitter 270 measured by MS 220 may indicate, at least in part, a distance between MS 220 and transmitter 270. Further, such an indicated distance combined with a known location of MS 220, may lead to a solution for a location of transmitter 270. In a particular implementation, MS 220 may communicate newly-learned information associated with transmitter 270 to a wireless network (not shown). MS 220 may store such newly-learned information in updated BSA 225. In another particular implementation, upon request by MS 220, a wireless network may provide information if the wireless network has such information regarding transmitter 270 to MS 220. In other words, upon recently detecting the presence of transmitter 270, MS 220 may query a wireless network for information regarding newly-discovered transmitter 270, though the wireless network may also lack such information. In yet another particular implementation, an updated mobile almanac 225 may transmit at least portions of its contents from its MS host to a location server, for example. Such a location server may comprise a portion of a wireless network, or it may be independently operated.

In an implementation, a determination that BSA 225 includes old data, as in block 440, may lead to a process of updating BSA 225 that includes block 450, 460, and 470, as explained above. Old data may be considered less reliable than newer data. In a particular implementation, BSA data associated with individual transmitters may comprise a time stamp to indicate an age of the data. In another implementation, data may include a flag, or a "dirty bit" that may be set if associated data is old and/or expired. In such a case, BSA 225 may be updated with a location fix performed at block 450 associated with information received from one or more transmitters 230 at block 460.

In an implementation, an MS may request SNA information, particularly BSA information, in discrete blocks. Such information may correspond to a particular transmitter or to a wireless service area, for example. An MS may request such blocks in a manner that would provide specific information about an individual transmitter in its local environment, as well as information regarding broader service areas where an MS may likely operate in the future. To allow for such a mix of specific and broad information, multiple naming conventions may be used, so that an MS may download useful information without a need for further communications and negotiations with a network entity, for example. To illustrate, a naming convention may include: a descriptive portion, which may specify a service level; a number, which may specify a specific transmitter; and an extension, which may further specify a service level. For example, a name may include "SIDXXXX.sna" and/or "SIDXXXX_NIDYYYY.bsa". In these examples, "SID" and "NID" may specify a service level, and "XXXX" and "YYYY" may specify a specific region. A ".sna" (sparse network almanac) file may provide information for a service area associated with its name. A .bsa (base station almanac) file may provide BSA information for all transmitters associated with its name. In a particular implementation, such files may be available for an MS to download. An MS may determine whether to download such information based at least in part on knowledge of its own storage and communications capacity, as well as how useful the MS determines such information to be. Such files may be compressed and password protected, so they may be encapsulated for only the use of an MS's positioning engine, for example. Accordingly, such protection may help prevent other entities from simply copying information for unintended uses. Of course, such a naming convention is merely an example, and claimed subject matter is not so limited.

Figure 5:
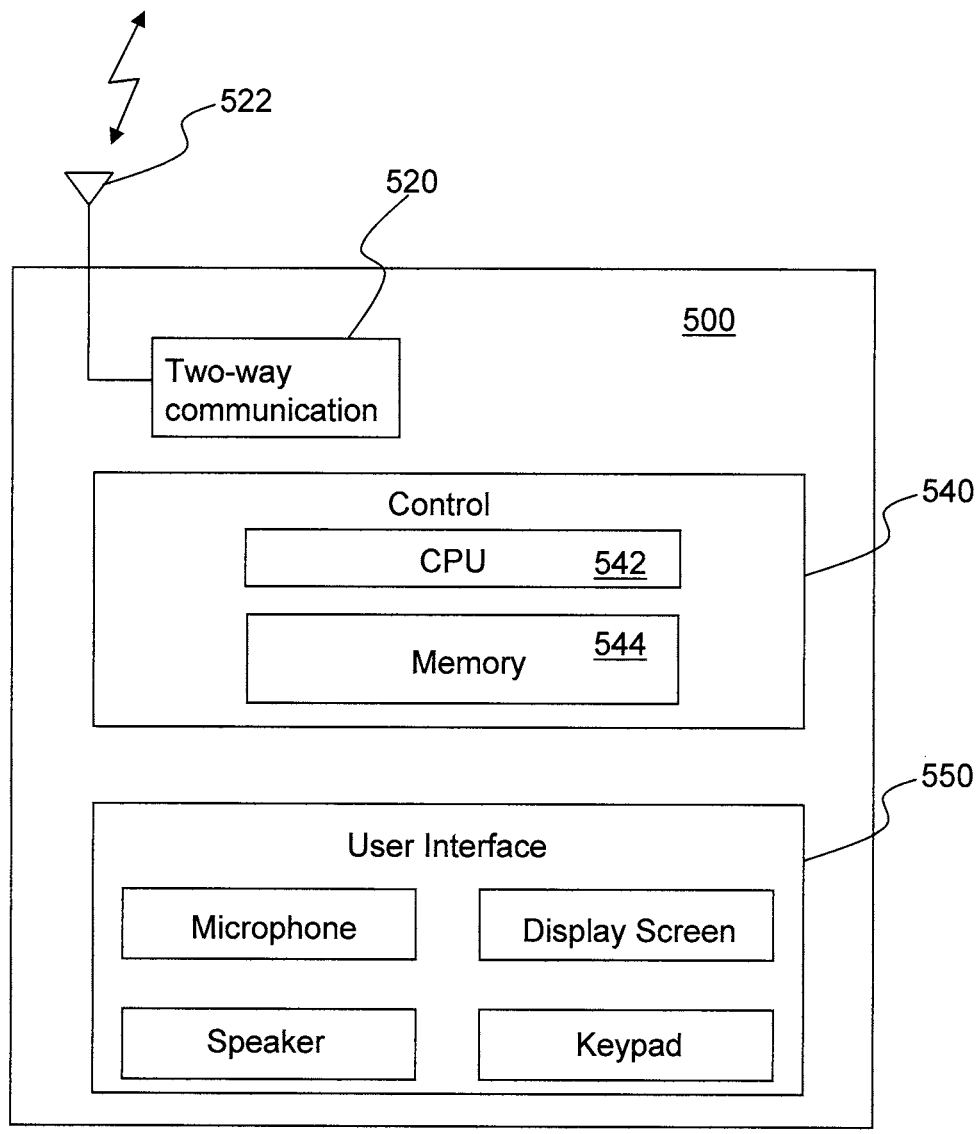
FIG. 5 is a schematic diagram of a device capable of communication with a wireless network, according to one implementation.

FIG. 5 is a schematic diagram of a device 500 capable of communication with a wireless network, according to one implementation. Such a device may include an MS, such as MS 220 shown in FIG. 2, for example. Device 500 may include a two-way communication system 520, such as but not limited to a cellular communication system, which may transmit and receive signals via antenna 522. The communication system 520 may include a modem adapted to process information for communication in one or more of the aforementioned networks. In one alternative implementation, device 500 may include a position location system, such as an SPS receiver to receive SPS signals. The modem and SPS receiver may communicate with one another, and such communication may include, for example, the cellular identification of the device, estimates of time and/or location, frequency, or other radio information. In another implementation, device 500 may not include a position location system, so that the device lacks any inherent ability to acquire SPS signals.

Mobile control 540 may include a special purpose computing apparatus comprising a central processing unit (CPU) 542 and associated memory 544, hardware, software, and firmware. It will be understood as used herein that the CPU 542 can, but need not necessarily include, one or more microprocessors, embedded processors, controllers, application specific integrated circuits (ASICs), digital signal processors (DSPs), and the like. The term CPU is intended to describe the functions implemented by the system rather than specific hardware. In an alternative implementation memory 544 may include a look-up table, as discussed above. Memory 544 may store machine-readable instructions which, if executed by CPU 542, may enable device 500 to determine its location, as in at least the implementations described above. Such machine-readable instructions may be downloaded, e.g., received via two-way communication 520, from a remote entity such as a wireless carrier, for example. Machine-readable instructions may include an application that allows device 500 to identify and extract identification information of a cellular base station included in a pilot signal. Such an application may also include a look-up table of cellular base station information for a region or the world. Of course, claimed subject matter is not limited to these examples, which are only described here to help illustrate various implementations. Memory 544 may comprise one or more types of storage media identified above. A user interface 550 may allow a user to enter information into and receive information, such as voice or data, from device 500. The user interface 550 may include, for example, a keypad, a display screen, a microphone, and a speaker.

Techniques such as those described above may have a number of benefits. In one application, a sparse network almanac may be configured to provide efficient positioning within the memory constraints of a mobile device. If memory and communication resources were not an issue, a mobile device could receive and store information about all possible transmitters, so that once a mobile device recognizes a particular transmitter, it could access the associated position of the transmitter. The transmitter position could be used as a coarse position for a satellite position fix, and/or could be used in combination with measurements from additional terrestrial transmitters to obtain a position fix.

In the current techniques, a sparse network almanac includes at least a service area almanac. The service area almanac differs from existing almanacs such as BSAs, because it associates a service area (or region) with a location within the service area, but does not associate a transmission from a particular transmitter with the location of that transmitter. In a simple example where the NIDs of the system are used to identify service areas, there may be a large number of transmitters that share the same NID, but the service area almanac does not include the positions of the transmitters. Instead, the service area almanac may associate a single location with each NID.

In operation, a mobile device with a service area almanac may be powered on in an area for which it does not have base station almanac information in its memory. However, it may access information related to a serving transmitter (e.g., from communications on a paging channel or a traffic channel) that identifies the region in which the mobile device is located. The mobile device accesses the service area almanac to determine location information associated with the region identifier. Using the determined location information as its coarse location, the mobile device can initiate a satellite positioning operation. If the mobile device is not yet communicating with a communication network, the mobile device may access on-board satellite position information (e.g., stored satellite almanac, ephemeris, long term orbit models) and use the on-board information along with the coarse location and time to determine probable satellites in view, and to set search windows. This technique may significantly reduce the time to first fix (TTFF) when the mobile device is turned on in a new region.

The mobile device may also download a regional BSA based on the identification of the region and/or the determined position of the mobile device. In the example above, the mobile device may have on-board BSA for the region in which the mobile device was previously operated. Upon detection of the different region, and once the mobile device is communicating with a communication network, the mobile device may download BSA information applicable to the new region (either storing it in additional memory or overwriting the currently stored BSA). Once BSA information is available to the mobile device (either on-board or over the network), the mobile device can perform terrestrial positioning techniques such as Advanced Forward Link Trilateration (AFLT), time difference of arrival (TDOA), etc. Additionally, the availability of BSA information generally means that a more accurate coarse location is available for satellite positioning. Hybrid positioning techniques (e.g., positioning using both satellite and terrestrial positioning information) may also be used.

In some cases, available information that can be used to identify a particular region may not provide the desired accuracy. In the example of a NID discussed above, if the transmitters sharing a particular NID span a region where the position uncertainty exceeds about 75 km, the TTFF may not be reduced as desired. In such a case, sub-regions may be defined to provide a more accurate coarse location. In some cases, the sub-regions may be defined using ranges of transmitter identifiers, if there is sufficient order in the transmitter identifiers. In some cases, the sub-regions may be defined using a list of transmitters (or a combination of range/list information). In other cases, sub-regions may be defined differently; however, there may be a cost in device memory or overhead message size. For example, additional identification information may be added identifying a region/sub-region to facilitate a service area almanac as described herein.

In an embodiment, a mobile device receives signals from a terrestrial transmitter, for which the mobile device does not have stored base station almanac information (and thus does not know the position of the transmitter). The mobile device accesses information from the received signals that is indicative of a region that includes the transmitter. As noted above, various types of information may be used as the region identifier, depending on the service provider, the communication protocol, the size of the region, etc. The mobile device has a stored service area almanac, which includes a plurality of region identifiers and associated coarse locations. However, unlike a base station almanac, the service area almanac does not include a position of all of the terrestrial transmitters. Because of this difference, a mobile device may be able to store a service area almanac that covers all of the transmitters associated with a service provider, all of the transmitters it may be able to communicate with in its home country or region, or even all of the transmitters it may be able to communicate with globally.

Once the mobile device receives the region identifier for the transmitter, the mobile device may access the stored service area almanac to determine a coarse location and/or a location uncertainty associated with the region identifier for the transmitter. For example, a plurality of transmitters may share the same region identifier, and the coverage area of these transmitters may be bounded by a coverage boundary (which need not have any particular shape). The coarse location associated with the region identifier is a location within the coverage boundary. In order to provide more accurate positioning, the coarse location may be selected as the center of the coverage boundary, as a point at which the location uncertainty is minimized, or it may be weighted in some way to reflect a density of transmitters within the coverage area (e.g., if most of the transmitters are clustered, the coarse location may be skewed toward the cluster from the center, although in some instances it may be better to define sub-regions for clustered transmitters). The location uncertainty may be the greatest distance between the coarse location and the coverage boundary. In the example where the coverage boundary is a circle, and the coarse location is selected as the center of the circle, the location uncertainty may be selected as the radius of the circle. The uncertainty in the current time as measured at the mobile device may also be used to determine the location uncertainty.

The mobile device may also access locally-stored satellite orbit information (as described above). The coarse location, location uncertainty, and satellite orbit information may be used to set one or more satellite search parameters. For example, the coarse location, location uncertainty, and/or satellite orbit information (as well as the current time) may be used to identify satellites that may be in view of the mobile device (and thus whose signals may be received and processed for a satellite positioning operation).

The satellite search parameters may also include search windows. For example, if a particular satellite is expected to be in view, its expected code phase at the mobile device may be determined using its position, the coarse location of the mobile device, and the current time. The code phase "search window" can be set using the location uncertainty, so that the code phases associated with the uncertainty are searched.

Once satellite search parameters are determined, a satellite positioning operation may be initiated. Using the above techniques, the time to first fix may be decreased compared to existing techniques.

After the mobile device determines that stored base station almanac information for the transmitter is not available, it may initiate a download of a base station almanac update, where the update includes base station almanac information about the transmitter. The download may include base station information about a plurality of transmitters that include transmitters outside the range of the mobile device as well as transmitters from which the mobile device may be receiving signals (which may be referred to as a regional base station almanac), or may just include base station information for any current transmitters in the range of the mobile device. Once the mobile device has base station almanac information about one or more transmitters from which it is receiving signals, it may be able to determine a better coarse location and/or perform a location fix using terrestrial transmitters.

The mobile device may include receiver/transceiver circuitry to receive the signals from terrestrial transmitters, and memory to store service area almanac information, base station almanac information (if any), satellite orbit information, etc. The mobile device may include a processor (which may be in a single module or may include processing resources in multiple modules), to access information from received signals, access stored information, and determine coarse location, location uncertainty, satellite parameters, etc. using the stored information. The mobile device may include satellite positioning circuitry to perform satellite positioning operations using the satellite parameters.

Some portions of the detailed description above are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, information, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "associating", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or software implementation, methodologies may be implemented with modules (e.g., procedures, functions, and so on) that perform the functions described herein. Any machine-readable medium tangibly embodying instructions may be used in implementing the methodologies described herein. For example, software codes may be stored in a memory, for example the memory of a mobile station, and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

A satellite positioning system (SPS) typically comprises a system of transmitters positioned to enable entities to determine their location on the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellites. For example, a satellite in a constellation of a Global Navigation Satellite System (GNSS) such as Global Positioning System (GPS), Galileo, Glonass or Compass may transmit a signal marked with a PN code that is distinguishable from PN codes transmitted by other satellites in the constellation.

To estimate a location at a receiver, a navigation system may determine pseudorange measurements to satellites "in view" of the receiver using well known techniques based, at least in part, on detections of PN codes in signals received from the satellites. Such a pseudorange to a satellite may be determined based, at least in part, on a code phase detected in a received signal marked with a PN code associated with the satellite during a process of acquiring the received signal at a receiver. To acquire the received signal, a navigation system typically correlates the received signal with a locally generated PN code associated with a satellite. For example, such a navigation system typically correlates such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed above.

Upon detection of a code phase of a signal received from a GNSS satellite, a receiver may form multiple pseudorange hypotheses. Using additional information, a receiver may eliminate such pseudorange hypotheses to, in effect, reduce an ambiguity associated with a true pseudorange measurement. With sufficient accuracy in knowledge of timing of a signal received from a GNSS satellite, some or all false pseudorange hypotheses may be eliminated.

A "space vehicle" (SV) as referred to herein relates to an object that is capable of transmitting signals to receivers on the Earth's surface. In one particular example, such an SV may comprise a geostationary satellite. Alternatively, an SV may comprise a satellite traveling in an orbit and moving relative to a stationary location on the Earth. However, these are merely examples of SVs and claimed subject matter is not limited in these respects.

Location determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

Techniques described herein may be used with any one of several SPS' and/or combinations of SPS'. Furthermore, such techniques may be used with location determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with time. Such a transmitter may be assigned a unique PN code so as to permit identification by a remote receiver. Pseudolites may be useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
   receiving signals from one or more transmitters located in a region; and
   executing instructions on a specific apparatus to electronically associate a location fix of a mobile station operating in said region with said received signals to update a sparse network almanac that includes signals stored in a storage medium representing a regional base station almanac and signals representing a service area almanac.

2. The method of claim 1, wherein said regional base station almanac includes information that covers a sub-region of a larger region that is covered by said service area almanac.

3. The method of claim 1, wherein said regional base station almanac comprises signals representing hierarchically defined information descriptive of service areas of said one or more transmitters in said region.

4. The method of claim 3, wherein said hierarchically defined information includes a service level defining geographical entities and sub-service levels defining smaller geographical entities within said service level.

5. The method of claim 4, wherein said service level comprises a country code including one or more network codes associated with said country code.

6. The method of claim 5, wherein said one or more network codes respectively include one or more location area codes or radio network controller codes.

7. The method of claim 4, wherein said associating said location fix with said received signals comprises:
   executing instructions on said specific apparatus to electronically determine one or more service levels among said service levels of transmitter information that include said region, said determining being based at least in part on said received signals and/or said location fix.

8. The method of claim 7, wherein said updating said sparse network almanac comprises:
   executing instructions on said specific apparatus to electronically maintain and update signals that represent information corresponding to said one or more service levels in said sparse network almanac.

9. The method of claim 3, wherein said signals received from said one or more transmitters located in said region include signals representing coverage area information associated with said one or more transmitters.

10. The method of claim 3, further comprising receiving said location fix before said receiving said signals from said one or more transmitters.

11. The method of claim 3, wherein said mobile station maintains said sparse network almanac in a memory of said mobile station.

12. The method of claim 3, further comprising:
    transmitting signals representing portions of said updated sparse network almanac from said mobile station to a network entity.

13. The method of claim 3, further comprising:
    reducing a signal acquisition window based at least in part on said updated sparse network almanac.

14. The method of claim 3, further comprising:
executing instructions on a specific apparatus to electronically search for navigation information based at least in part on a probability of success, an expected accuracy, a search time, and/or a power usage for a subsequent location fix based at least in part on said updated sparse network almanac.

15. The method of claim 3, wherein said signals received from said one or more transmitters located in said region includes a time stamp associated with said one or more transmitters.

16. The method of claim 3, further comprising:
executing instructions on a specific apparatus to electronically request service level information from a wireless network based at least in part on determining a probability of success, an expected accuracy, a search time, and/or a power usage for a subsequent location fix based at least in part on said updated sparse network almanac.

17. The method of claim 3, wherein said sparse network almanac further comprises non-hierarchically defined information based at least in part on said hierarchically defined information.

18. The method of claim 1, wherein said sparse network almanac comprises signals representing a list of one or more service area locations.

19. The method of claim 1, wherein said signals received from said one or more transmitters located in said region include signals representing location information associated with said one or more transmitters.

20. A mobile station comprising:
a receiver configured to operate in a radio frequency (RF) environment to receive information from one or more transmitters located in a region; and
a processor configured to associate a location fix of a mobile station operating in said region with said received information to update a sparse network almanac, said sparse network almanac comprising signals stored in a storage medium representing a regional base station almanac and signals representing a service area almanac.

21. The mobile station of claim 20, wherein said sparse network almanac further comprises hierarchically defined information descriptive of locations of said transmitters in said region, and wherein said hierarchically defined information includes a service level defining geographical entities and sub-service levels defining smaller geographical entities within said service level.

22. The mobile station of claim 21, wherein said service level comprises a country code including one or more network codes associated with said country code.

23. The mobile station of claim 22, wherein said one or more network codes respectively include one or more location area codes respectively associated with said one or more network codes.

24. The mobile station of claim 21, wherein said information received from said one or more transmitters located in said region includes location information associated with said one or more transmitters.

25. The mobile station of claim 21, wherein said information received from said one or more transmitters located in said region includes coverage area information associated with said one or more transmitters.

26. The mobile station of claim 21, further comprising a location server to maintain said sparse network almanac in a location server.

27. The mobile station of claim 21, wherein said receiver is further configured to:
transmit portions of said updated sparse network almanac from said mobile station to a location server.

28. The mobile station of claim 21, wherein said receiver is further configured to:
reduce a navigation acquisition window based at least in part on said updated sparse network almanac.

29. The mobile station of claim 21, wherein said receiver is further configured to:
decide whether to search for navigation information based at least in part on a probability of success, an expected accuracy, a search time, and/or a power usage for a subsequent location fix based at least in part on said updated sparse network almanac.

30. The mobile station of claim 21, wherein said sparse network information includes a global cell identifier.

31. The mobile station of claim 21, wherein said parameter information includes a time stamp associated with said one or more transmitters.

32. The mobile station of claim 21, wherein said receiver is further configured to:
request service level information from a wireless network based at least in part on determining a probability of success, an expected accuracy, a search time, and/or a power usage for a subsequent location fix based at least in part on said updated sparse network almanac.

33. The mobile station of claim 21, wherein said sparse network almanac further comprises non-hierarchically defined information based at least in part on said hierarchically defined information.

34. The mobile station of claim 21, wherein said processor is configured to request sparse network almanac (SNA) information in discrete addressable blocks, wherein said SNA information corresponds to a particular transmitter and/or to a wireless service area.

35. An apparatus comprising:
means for receiving signals from one or more transmitters located in a region; and
means for executing instructions on a specific apparatus to electronically associate a location fix of a mobile station operating in said region with said received signals to update a sparse network almanac that includes signals stored in a storage medium representing a regional base station almanac and signals representing a service area almanac.

36. The apparatus of claim 35, wherein said regional base station almanac includes information that covers a sub-region of a larger region that is covered by said service area almanac.

37. The apparatus of claim 35, wherein said regional base station almanac comprises signals representing hierarchically defined information descriptive of service areas of said one or more transmitters in said region.

38. The apparatus of claim 37, wherein said hierarchically defined information includes a service level defining geographical entities and sub-service levels defining smaller geographical entities within said service level.

39. The apparatus of claim 38, wherein said means for associating said location fix with said received information comprises:
means for executing instructions on said specific apparatus to electronically determine one or more service levels among said service levels of transmitter information that include said region, said determining being based at least in part on said received signals and/or said location fix.

40. The apparatus of claim 39, wherein said means for updating said sparse network almanac comprises:
means for executing instructions on said specific apparatus to electronically maintain and update signals that represent information corresponding to said one or more service levels in said sparse network almanac.

41. The apparatus of claim 40, further comprising means for updating said sparse network almanac at said location server.

42. The apparatus of claim 35, wherein said sparse network almanac comprises signals representing a list of one or more service area locations.

43. The apparatus of claim 35, wherein said signals received from said one or more transmitters located in said region include signals representing coverage area information associated with said one or more transmitters.

44. The apparatus of claim 35, further comprising means for receiving said location fix before said receiving said information from said one or more transmitters.

45. The apparatus of claim 35, wherein said mobile station maintains said sparse network almanac in a location server.

46. The apparatus of claim 35, further comprising:
means for transmitting portions of said updated sparse network almanac from said mobile station to a location server.

47. The apparatus of claim 35, further comprising:
means for reducing a signal acquisition window based at least in part on said updated sparse network almanac.

48. The apparatus of claim 35, further comprising:
means for executing instructions on a specific apparatus to electronically search for navigation information based at least in part on a probability of success, an expected accuracy, a search time, and/or a power usage for a subsequent location fix based at least in part on said updated sparse network almanac.

49. The apparatus of claim 35, wherein said information received from said one or more transmitters located in said region includes a time stamp associated with said one or more transmitters.

50. The apparatus of claim 35, further comprising:
means for executing instructions on a specific apparatus to electronically request service level information from a wireless network based at least in part on determining a probability of success, an expected accuracy, a search time, and/or a power usage for a subsequent location fix based at least in part on said updated sparse network almanac.

51. The apparatus of claim 35, wherein said sparse network almanac further comprises non-hierarchically defined information based at least in part on hierarchically defined information.

52. The apparatus of claim 51, wherein said non-hierarchically defined information comprises one or more WiFi access points and said hierarchically defined information comprises one or more wide area network elements.

53. The apparatus of claim 35, further comprising means for updating said sparse network almanac at said mobile station.

54. A method comprising:
receiving signals representing a sparse network almanac while operating a mobile station in a region;
receiving signals representing information from one or more transmitters located in said region; and
executing instructions on a specific apparatus to electronically associate a location fix of said mobile station operating in said region with said received signals from said one or more transmitters to update said sparse network almanac that includes signals stored in a storage medium representing a regional base station almanac and signals representing a service area almanac.

55. The method of claim 54, wherein said regional base station almanac includes information that covers a sub-region of a larger region that is covered by said service area almanac.

56. The method of claim 54, wherein said regional base station almanac comprises signals representing hierarchically defined information descriptive of service areas of said one or more transmitters in said region.

57. The method of claim 56, wherein said hierarchically defined information includes a service level defining geographical entities and sub-service levels defining smaller geographical entities within said service level.

58. The method of claim 57, wherein said service level comprises a country code including one or more network codes associated with said country code.

59. The method of claim 58, wherein said one or more network codes respectively include one or more location area codes or radio network controller codes.

60. The method of claim 54, wherein said sparse network almanac comprises signals representing a list of one or more service area locations.

61. The method of claim 54, wherein said signals received from said one or more transmitters located in said region include signals representing location information associated with said one or more transmitters.

62. A method comprising:
maintaining a sparse network almanac in a memory, the sparse network almanac including signals stored in a storage medium representing a regional base station almanac and signals representing a service area almanac;
receiving signals representing almanac information from a mobile station operating in a region that includes one or more transmitters, said almanac information based, at least in part, on an association between a location fix of said mobile station and information received from said one or more transmitters; and
executing instructions on a specific apparatus to electronically update said sparse network almanac based, at least in part, on said received signals representing almanac information.

63. The method of claim 62, wherein said sparse network almanac comprises a regional base station almanac and a service area almanac.

64. The method of claim 63, wherein said sparse network almanac comprises hierarchically defined information descriptive of service areas of said one or more transmitters in said region.

65. The method of claim 64, wherein said hierarchically defined information includes a service level defining geographical entities and sub-service levels defining smaller geographical entities within said service level.

66. The method of claim 65, wherein said service level comprises a country code including one or more network codes associated with said country code.

67. The method of claim 66, wherein said one or more network codes respectively include one or more location area codes or radio network controller codes.

68. The method of claim 62, wherein said information received from said one or more transmitters located in said region includes code phase/timing information, ID information, and/or signal strength information associated with said one or more transmitters.

69. An apparatus comprising:
- means for maintaining a sparse network almanac in a memory, the sparse network almanac including signals stored in a storage medium representing a regional base station almanac and signals representing a service area almanac;
- means for receiving signals representing almanac information from a mobile station operating in a region that includes one or more transmitters, said almanac information based, at least in part, on an association between a location fix of said mobile station and information received from said one or more transmitters; and
- executing instructions on a specific apparatus to electronically update said sparse network almanac based, at least in part, on said received signals representing almanac information.

70. The apparatus of claim 69, wherein said sparse network almanac comprises a regional base station almanac and a service area almanac.

71. The apparatus of claim 70, wherein said sparse network almanac comprises hierarchically defined information descriptive of service areas of said one or more transmitters in said region.

72. The apparatus of claim 71, wherein said hierarchically defined information includes a service level defining geographical entities and sub-service levels defining smaller geographical entities within said service level.

73. The apparatus of claim 72, wherein said service level comprises a country code including one or more network codes associated with said country code.

74. The apparatus of claim 73, wherein said one or more network codes respectively include one or more location area codes or radio network controller codes.

75. The apparatus of claim 69, wherein said information received from said one or more transmitters located in said region includes code phase/timing information, ID information, and/or signal strength information associated with said one or more transmitters.

76. An apparatus comprising:
- a memory configured to maintain a sparse network almanac that includes signals stored in a storage medium representing a regional base station almanac and signals representing a service area almanac;
- a receiver configured to operate in a radio frequency (RF) environment to receive signals representing almanac information from a mobile station operating in a region that includes one or more transmitters, said almanac information based, at least in part, on an association between a location fix of said mobile station and information received from said one or more transmitters; and
- a processor configured to electronically update said sparse network almanac based, at least in part, on said received signals representing almanac information.

77. The apparatus of claim 76, wherein said sparse network almanac comprises a regional base station almanac and a service area almanac.

78. The apparatus of claim 77, wherein said sparse network almanac comprises hierarchically defined information descriptive of service areas of said one or more transmitters in said region.

79. The apparatus of claim 78, wherein said hierarchically defined information includes a service level defining geographical entities and sub-service levels defining smaller geographical entities within said service level.

80. The apparatus of claim 79, wherein said service level comprises a country code including one or more network codes associated with said country code.

81. The apparatus of claim 80, wherein said one or more network codes respectively include one or more location area codes or radio network controller codes.

82. The apparatus of claim 76, wherein said information received from said one or more transmitters located in said region includes code phase/timing information, ID information, and/or signal strength information associated with said one or more transmitters.

\* \* \* \* \*